(12) United States Patent
Liu

(10) Patent No.: US 11,469,962 B2
(45) Date of Patent: Oct. 11, 2022

(54) METHOD AND APPARATUS FOR CONFIGURING INFORMATION OF INDICATING TIME-FREQUENCY POSITION OF SSB, AND METHOD AND APPARATUS FOR DETERMINING TIME-FREQUENCY POSITION OF SSB

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 72 days.

(21) Appl. No.: 16/962,573

(22) PCT Filed: Jan. 26, 2018

(86) PCT No.: PCT/CN2018/074359
§ 371 (c)(1),
(2) Date: Jul. 16, 2020

(87) PCT Pub. No.: WO2019/144387
PCT Pub. Date: Aug. 1, 2019

(65) Prior Publication Data
US 2020/0366560 A1  Nov. 19, 2020

(51) Int. Cl.
*H04L 12/24* (2006.01)
*H04L 41/0896* (2022.01)
(Continued)

(52) U.S. Cl.
CPC ...... *H04L 41/0896* (2013.01); *H04L 41/0806* (2013.01); *H04W 56/0015* (2013.01); *H04W 74/0833* (2013.01); *H04W 88/08* (2013.01)

(58) Field of Classification Search
CPC ............ H04L 41/0896; H04L 41/0806; H04L 5/0007; H04L 5/0053; H04L 5/0094;
(Continued)

(56) References Cited

U.S. PATENT DOCUMENTS

2011/0223915 A1  9/2011  Kwack et al.
2014/0348077 A1  11/2014  Chen et al.
(Continued)

FOREIGN PATENT DOCUMENTS

CN   102104973 A   6/2011
CN   102404689 A   4/2012
(Continued)

OTHER PUBLICATIONS

State Intellectual Property Office of the People's Republic of China, Office Action and Search Report Issued in Application No. 201880000064.8, dated May 20, 2020, 19 pages, (Submitted with Machine Translation).
(Continued)

*Primary Examiner* — Walli Z Butt
(74) *Attorney, Agent, or Firm* — Syncoda LLC; Feng Ma

(57) ABSTRACT

A method of configuring information includes: generating first configuration information, wherein the first configuration information indicates a time-frequency position of a synchronization signal block (SSB) corresponding to a common control resource set (CORESET) of current remaining minimum system information (RMSI); and sending the first configuration information to user equipment (UE). By generating and sending to the UE the first configuration information indicating the time-frequency position of the SSB corresponding to the CORESET of the current RMSI, a flexible configuration for time-frequency position of SSB can be realized, and the UE can easily get the time-frequency position of the SSB corresponding to the CORE-
(Continued)

SET of the current RMSI based on the position of the CORESET of the current RMSI and the received first configuration information.

12 Claims, 12 Drawing Sheets

(51) Int. Cl.
  *H04L 41/0806* (2022.01)
  *H04W 56/00* (2009.01)
  *H04W 74/08* (2009.01)
  *H04W 88/08* (2009.01)
(58) Field of Classification Search
  CPC ..... H04L 1/0013; H04L 5/0044; H04L 5/005;
       H04W 56/0015; H04W 74/0833; H04W
       88/08; H04W 56/00; H04W 72/042;
       H04W 72/0446; H04W 72/0453
  See application file for complete search history.

(56) References Cited

U.S. PATENT DOCUMENTS

| | | | |
|---|---|---|---|
| 2017/0353254 A1 | 12/2017 | Islam et al. | |
| 2019/0150121 A1* | 5/2019 | Abdoli | H04L 5/0053 370/329 |
| 2019/0159261 A1* | 5/2019 | Jung | H04W 56/001 |
| 2019/0230534 A1* | 7/2019 | John Wilson | H04W 24/08 |
| 2020/0260368 A1* | 8/2020 | Liu | H04W 72/046 |
| 2021/0185683 A1* | 6/2021 | Reial | H04W 72/0493 |

FOREIGN PATENT DOCUMENTS

| | | |
|---|---|---|
| CN | 102612088 A | 7/2012 |
| CN | 105612801 A | 5/2016 |
| KR | 20160005003 A | 1/2016 |
| RU | 2533313 C2 | 11/2014 |
| RU | 2641664 C2 | 1/2018 |
| WO | 2017180030 A1 | 10/2017 |

OTHER PUBLICATIONS

ISA State Intellectual Property Office of the People's Republic of China, International Search Report Issued in Application No. PCT/CN2018/074359, dated Nov. 1, 2018, WIPO, 4 pages.
Intel Corporation, "Details on NR PBCH design", 3GPP TSG RAN WG1 Meeting RAN1#89, Hangzhou,P.R. China, R1-1707339, May 15-19, 2017, 8 pages.
Intel Corporation, "On BWP reconfiguration" 3GPP TSG-RAN WG4 Meeting #85, Reno,USA, R4-1712875, Nov. 27-Dec. 1, 2017, 5 pages.
Samsung. ""Summary of Offline Discussion on RMSL CORESET Configuration"" 3GPP TSG RAN WG1 #91, RI-1721709. Reno USA. Nov. 27-Dec. 1, 2017, 26 pages.
European Patent Office, Extended European Search Report Issued in Application No. 18902021.7, dated Nov. 2, 2020 Germany, 8 pages.
Samsung, "NR-PBCH contents and payload size",3GPP TSG RAN WG1 Meeting #90,Prague, P.R. Czechia, R1-1713554, Aug. 21-25, 2017, 5 pages.
Vivo,"Discussion on Remaining Minimum System Information",3GPP TSG RAN WG1 Meeting #90bis,Prague, Czech Republic, R1-1717461, Oct. 9-13, 2017, 15 pages.
Nokia, Nokia Shanghai Bell,"Remaining details related to SS blocks",3GPP TSG-RAN WG1 meeting #91, Reno, Nevada, USA, R1-1721361, Nov. 27-Dec. 1, 2017, 6 pages.
ISA State Intellectual Property Office of the People's Republic of China, Written Opinion of the International Searching Authority Issued in Application No. PCT/CN2018/074359, dated Nov. 1, 2018, WIPO, 9 pages.
State Intellectual Property Office of the People's Republic of China, Office Action and Search Report Issued in Application No. 201880000064.8, dated Jan. 28, 2021, 53 pages. (Submitted with Machine Translation).
Huawei, HiSilicon,"On initial access for wideband carrier",3GPP TSG RAN WG1 NR Ad Hoc Meeting,Qingdao, China, R1-1709973, Jun. 27-30, 2017, 4 pages.
Samsung:"NR-PBCH contents and payload size", 3GPP TSG RAN WG1 Meeting #90, Prague, P.R. Czechia, Aug. 21-25, 2017, R1-1713554.
Samsung:"Summary of Offline Discussion on RMSI CORESET Configuraion", 3GPP TSG RAN WG1#91, Reno, USA, Nov. 27-Dec. 1, 2017, R1-17XXXXX.
Intellectual property India, Office Action Issued in Application No. 202047034482, dated Nov. 17, 2021, 6 pages.
Japanese Patent Office Action, Office Action Issued in Application No. 2020-560519, dated Oct. 5, 2021, 8 pages.
CATT, "Offline summary for AI 6.1.2.2 Remaining details on Remaining Minimum System Information", 3GPP TSG RAN WG1 Meeting NR#3,R1-1716806,Nagoya, Japan, Sep. 18-21, 2017, 15 pages.
MediaTek Inc."Summary of Bandwidth Part Remaining Issues", 3GPP TSG RAN WG1 Meeting AH 1801,R1-1801067, Vancouver, Canda, Jan. 22-26, 2018, 24 pages.
Samsung, "Remaining details on SS burst set related procedures", 3GPP TSG RAN WG1 Meeting NR#3,R1-1715908, Nagoya, Japan, Sep. 18-21, 2017, 9 pages.
European Patent Office, Office Action Issued in Application No. 18902021.7, Mar. 29, 2022, Netherlands, 6 pages.
Korean Intellectual Property Office, Office Action Issued in Application No. 10-2020-7024017, May 26, 2022, 12 pages. (Submitted with Machine Translation).
TSG RAN WG1, Status Report to TSG, 3GPP TSG RAN #78, Lisbon, Portugal, RP-172461, Dec. 12, 2017, 140 pages.
Ran WG1, "Reply LS on multiple SSBs within a wideband carrier", 3GPP TSG RAN WG1 NR Ad-hoc#3, R1-1716907, Nagoya, Japan, Sep. 18-21, 2017, 1 page.
RAN1 NR-Adhoc#3, List of RAN1 agreements,Initial access and mobility, Sep. 2017, 196 pages.

* cited by examiner

METHOD AND APPARATUS FOR CONFIGURING INFORMATION OF INDICATING TIME-FREQUENCY POSITION OF SSB, AND METHOD AND APPARATUS FOR DETERMINING TIME-FREQUENCY POSITION OF SSB

CROSS-REFERENCE TO RELATED APPLICATION

This application is a national stage of International Application No. PCT/CN2018/074359 filed on Jan. 26, 2018, the disclosure of which is hereby incorporated by reference in its entirety.

TECHNICAL FIELD

The present disclosure relates to the field of communication technologies, and in particular, relates to a method and an apparatus for configuring information, a method and an apparatus for determining time-frequency position, a base station, user equipment, and a computer-readable storage medium.

BACKGROUND

With the rapid development of wireless communication technology, the fifth-generation mobile communication technology (5th Generation, referred to as 5G) has emerged. As addressed in a recent discussion of the 3rd Generation Partnership Project (referred to as 3GPP), when an active bandwidth configured for user equipment (UE) is not an initial access bandwidth initially retrieved by the UE, a base station (gNB) can configure a common control resource set (referred to as CORESET) for the UE to receive additional remaining minimum system information (RMSI). However, in response to being configured with the new CORESET, the UE may receive RMSI immediately for random access. At this time, rate matching is to be performed for enabling the UE to get respective positions of a synchronous signal block (SSB) in frequency domain and time domain. According to an example in the related art, it is preset that, on all bandwidth parts (BWP), the time-frequency positions of both SSB and CORESET of RMSI are fixed, which limits flexibility.

SUMMARY

In view of this, the present application discloses a method and an apparatus for configuring information, a method and an apparatus for determining time-frequency position, a base station, user equipment, and a computer-readable storage medium, so as to realize a flexible configuration for time-frequency position of SSB and enable the UE to easily get the time-frequency position of the SSB.

According to a first aspect of the embodiments of the present disclosure, there is provided a method of configuring information, which is applicable to a base station, including:

generating first configuration information, wherein the first configuration information indicates a time-frequency position of a synchronization signal block (SSB) corresponding to a common control resource set (CORESET) of current remaining minimum system information (RMSI); and sending the first configuration information to user equipment (UE).

In an embodiment, sending the first configuration information to the UE includes:

adding the first configuration information to an information element (IE);

adding the IE to second configuration information, wherein the second configuration information is used to configure a bandwidth part corresponding to the CORESET of the current RMSI as an active bandwidth part; and sending the second configuration information to the UE through radio resource control (RRC) signaling.

According to a second aspect of the embodiments of the present disclosure, there is provided a method of determining a time-frequency position, which is applicable to user equipment (UE), including:

receiving first configuration information sent by a base station, wherein the first configuration information indicates a time-frequency position of a synchronization signal block (SSB) corresponding to a common control resource set (CORESET) of current remaining minimum system information (RMSI); and determining the time-frequency position of the SSB corresponding to the CORESET of the current RMSI based on a position of the CORESET of the current RMSI and the first configuration information.

In an embodiment, the method further includes:

in response to that the time-frequency position of the SSB corresponding to the CORESET of the current RMSI has been determined based on the position of the CORESET of the current RMSI and the first configuration information, performing rate matching with downlink data of a random access process based on the time-frequency position of the SSB.

In an embodiment, the method further includes:

in response to that the time-frequency position of the SSB corresponding to the CORESET of the current RMSI has been determined based on the position of the CORESET of the current RMSI and the first configuration information, performing rate matching with downlink data of a random access process based on the time-frequency position of the SSB;

receiving the SSB; and setting the received SSB as a reference beam.

In an embodiment, receiving the first configuration information sent by the base station includes:

receiving second configuration information sent by the base station through radio resource control (RRC) signaling, wherein the second configuration information is used to configure a bandwidth part corresponding to the CORESET of the current RMSI as an active bandwidth part;

obtaining an information element (IE) by parsing the second configuration information; and obtaining the first configuration information by parsing the IE.

According to a third aspect of the embodiments of the present disclosure, there is provided an apparatus for configuring information, which is applicable to a base station, including:

a generating module, configured to generate first configuration information, wherein the first configuration information indicates a time-frequency position of a synchronization signal block (SSB) corresponding to a common control resource set (CORESET) of current remaining minimum system information (RMSI); and a sending module, configured to send the first configuration information generated by the generating module to user equipment (UE).

In an embodiment, the sending module includes:

a first adding submodule, configured to add the first configuration information to an information element (IE);

a second adding submodule, configured to add the IE to the second configuration information, wherein the first configuration information has been added to the IE by the first adding submodule, and the second configuration information is used to configure a bandwidth part corresponding to the CORESET of the current RMSI as an active bandwidth part; and a sending submodule, configured to send the second configuration information to the UE through radio resource control (RRC) signaling, wherein the IE has been added to the second configuration information by the second adding submodule.

According to a fourth aspect of the embodiments of the present disclosure, there is provided an apparatus for determining a time-frequency position, which is applicable to user equipment, including:

a first receiving module, configured to receive first configuration information sent by a base station, wherein the first configuration information indicates a time-frequency position of a synchronization signal block (SSB) corresponding to a common control resource set (CORESET) of current remaining minimum system information (RMSI); and a first determining module, configured to determine the time-frequency position of the SSB corresponding to the CORESET of the current RMSI based on a position of the CORESET of the current RMSI and the first configuration information received by the first receiving module.

In an embodiment, the apparatus further includes:
a rate matching module, configured to, in response to the first determining module determining the time-frequency position of the SSB corresponding to the CORESET of the current RMSI, perform rate matching with downlink data of a random access process based on the time-frequency position of the SSB.

In an embodiment, the apparatus further includes:
a rate matching module, configured to, in response to the first determining module determining the time-frequency position of the SSB corresponding to the CORESET of the current RMSI, perform rate matching with downlink data of a random access process based on the time-frequency position of the SSB;
a second receiving module, configured to receive the SSB in response to the rate matching module performing the rate matching; and
a second determining module, configured to set the SSB received by the second receiving module as a reference beam.

In an embodiment, the first receiving module includes:
a receiving submodule, configured to receive second configuration information sent by the base station through radio resource control (RRC) signaling, wherein the second configuration information is used to configure a bandwidth part corresponding to the CORESET of the current RMSI as an active bandwidth part;
a first parsing submodule, configured to obtain an information element (IE) by parsing the second configuration information received by the receiving submodule; and
a second parsing submodule, configured to obtain the first configuration information by parsing the IE which has been obtained by parsing by the first parsing submodule.

According to a fifth aspect of the embodiments of the present disclosure, there is provided a base station, including:
a processor;
memory for storing executable instructions by the processor;
wherein the processor is configured to:
generate first configuration information, wherein the first configuration information indicates a time-frequency position of a synchronization signal block (SSB) corresponding to a common control resource set (CORESET) of current remaining minimum system information (RMSI); and send the first configuration information to user equipment (UE).

According to a sixth aspect of the embodiments of the present disclosure, there is provided user equipment, including:
a processor;
memory for storing processor executable instructions by the processor;
where the processor is configured to:
receive first configuration information sent by a base station, wherein the first configuration information indicates a time-frequency position of a synchronization signal block (SSB) corresponding to a common control resource set (CORESET) of current remaining minimum system information (RMSI); and determine the time-frequency position of the SSB corresponding to the CORESET of the current RMSI based on a position of the CORESET of the current RMSI and the first configuration information.

According to a seventh aspect of the embodiments of the present disclosure, there is provided a computer-readable storage medium with computer instructions stored thereon, which, when executed by a processor, implement the steps of the method of configuring information as described above.

According to an eighth aspect of the embodiments of the present disclosure, there is provided a computer-readable storage medium with computer instructions stored thereon, which, when executed by a processor, implement the steps of the method of determining a time-frequency position as described above.

The technical solutions provided by the embodiments of the present disclosure may have the following beneficial effects.

By generating and sending the first configuration information indicating the time-frequency position of the SSB corresponding to the CORESET of the current RMSI to the UE, a flexible configuration for time-frequency position of SSB can be realized, and the UE can easily get the time-frequency position of the SSB corresponding to the CORESET of the current RMSI based on the position of the CORESET of the current RMSI and the received first configuration information.

By receiving the first configuration information and determining the time-frequency position of the SSB corresponding to the CORESET of the current RMSI according to the position of the CORESET of the current RMSI and the first configuration information, it is possible to avoid errors in performing subsequent rate matching.

It should be understood that the above general description and the following detailed description are only exemplary and explanatory, and do not limit the present disclosure.

BRIEF DESCRIPTION OF THE DRAWINGS

The drawings here are incorporated into and constitute a part of the specification, show embodiments consistent with the present invention, and are used to explain the principles of the present invention together with the specification.

DETAILED DESCRIPTION

Figure 1A:
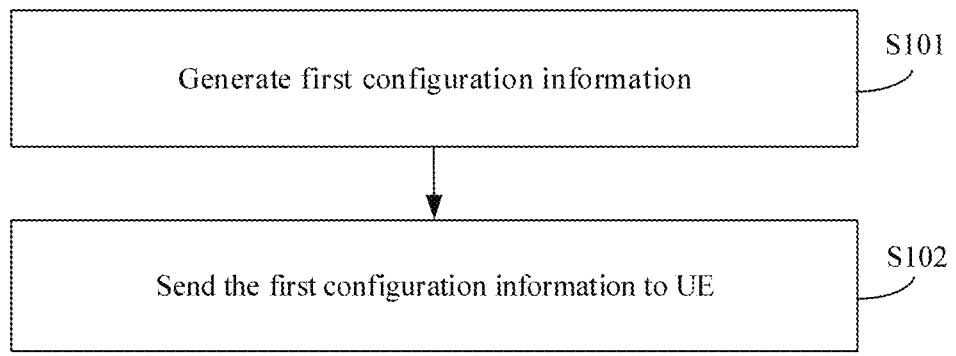
FIG. 1A is a flowchart of a method of configuring information according to an exemplary embodiment of the present application.

Exemplary embodiments will be described in detail herein, with the illustrations thereof represented in the drawings. When the following descriptions involve the drawings, like numerals in different drawings refer to like or similar elements unless otherwise indicated. The implementations described in the following exemplary embodiment do not represent all implementations consistent with the present disclosure. Rather, they are merely examples of apparatuses and methods consistent with some aspects of the present disclosure as detailed in the appended claims.

FIG. 1A is a flowchart of a method of configuring information according to an exemplary embodiment of the present application. This embodiment is described from a base station side. As shown in FIG. 1A, the method of configuring information includes steps S101 to S102.

At step S101, first configuration information is generated, wherein the first configuration information indicates a time-frequency position of an SSB corresponding to a CORESET of current RMSI.

The SSB refers to a synchronization signal block or a physical broadcast channel block.

Figure 1B:
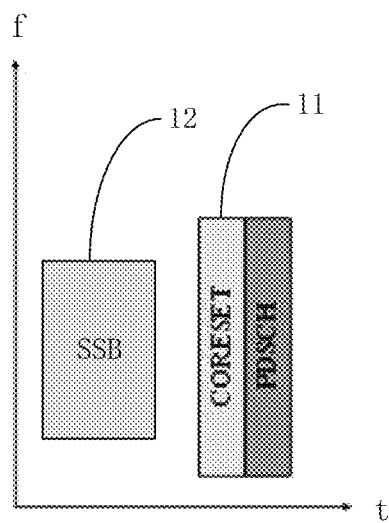
FIG. 1B is schematic diagram 1 showing a time-frequency position relationship between a CORESET of current RMSI and an SSB according to an exemplary embodiment of the present application.
Figure 1C:
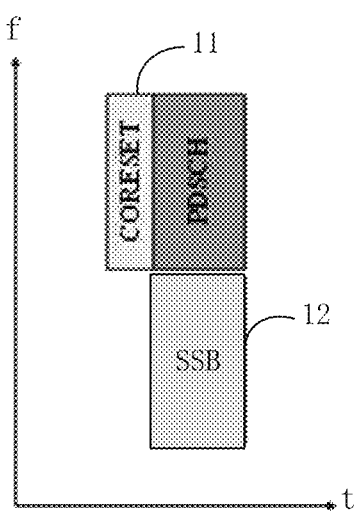
FIG. 1C is schematic diagram 2 showing a time-frequency position relationship between a CORESET of current RMSI and an SSB according to an exemplary embodiment of the present application.
Figure 1D:
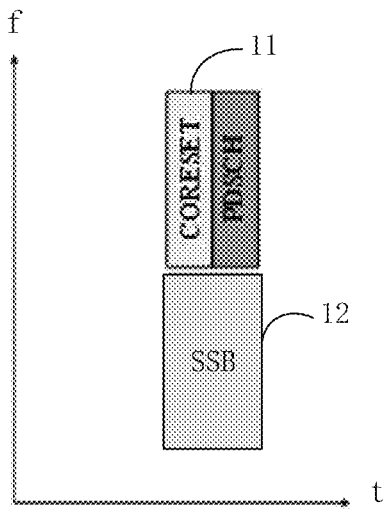
FIG. 1D is schematic diagram 3 showing the time-frequency position relationship between a CORESET of current RMSI and an SSB according to an exemplary embodiment of the present application.

In this embodiment, the time-frequency position relationship between the CORESET of the current RMSI and the SSB may be shown in FIG. 1B, FIG. 1C and FIG. 1D, wherein t represents time and f represents frequency. In FIG. 1B, CORESET 11 of the current RMSI and SSB 12 are located in the same BWP in frequency domain but differ in time domain. In FIG. 1C, CORESET 11 of the current RMSI and SSB 12 form a frequency-division multiplexing but differ in time domain. In FIG. 1D, CORESET 11 of the current RMSI and SSB 12 form a frequency-division multiplexing and are the same in time domain.

In this embodiment, the first configuration information may be used to indicate the time-frequency position of the SSB corresponding to the CORESET of the current RMSI. Since FIGS. 1B-1D show three time-frequency position relationships, the first configuration information is to occupy 2 bits. For example, three code points, (00, 01, 10), may be used to represent the three time-frequency position relationships shown in FIGS. 1B-1D, and the remaining code point, (11), may be used as a reserved bit or an extended bit.

At step S102, the first configuration information is sent to a UE.

Figure 2:
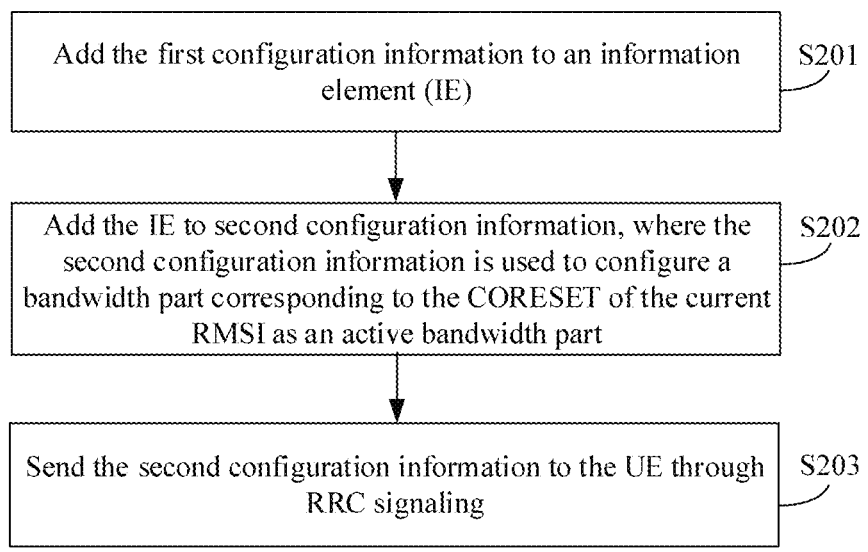
FIG. 2 is a flowchart of sending first configuration information to a UE according to an exemplary embodiment of the present application.

As shown in FIG. 2, sending the first configuration information to the UE may include steps S201 to S203.

At step S201, the first configuration information is added to an information element (IE).

The IE is a data structure that may be used to carry information, for example, the first configuration information. The base station may add the first configuration information to a preset IE. The preset IE refers to the IE that may carry the first configuration information.

At step S202, the IE is added to second configuration information, wherein the second configuration information is used to configure a bandwidth part corresponding to the CORESET of the current RMSI as an active bandwidth part (active BWP).

At step S203, the second configuration information is sent to the UE through radio resource control (RRC) signaling.

Since the first configuration information is included in the IE and the IE is included in the second configuration information, by sending the second configuration information to the UE through RRC signaling, an objective of sending the first configuration information to the UE is achieved with the simple implementation.

In the above embodiment, by generating and sending to the UE the first configuration information indicating the time-frequency position of the SSB corresponding to the CORESET of the current RMSI, a flexible configuration for time-frequency position of SSB can be realized, and the UE can easily get the time-frequency position of the SSB corresponding to the CORESET of the current RMSI based on the position of the CORESET of the current RMSI and the received first configuration information.

Figure 3:
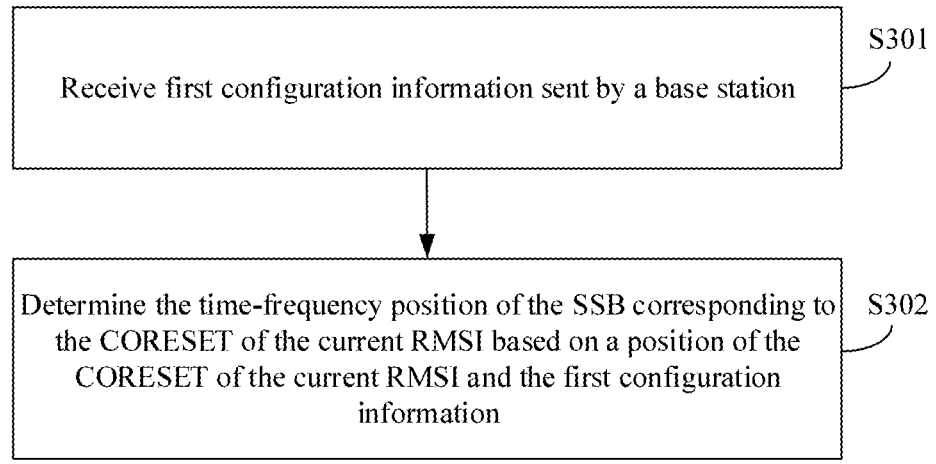
FIG. 3 is a flowchart of a method of determining a time-frequency position according to an exemplary embodiment of the present application.

FIG. 3 is a flowchart of a method of determining a time-frequency position according to an exemplary embodiment of the present application. This embodiment is described from a UE side. As shown in FIG. 3, the method includes steps S301 to S302.

At step S301, first configuration information sent by a base station is received, wherein the first configuration information indicates a time-frequency position of an SSB corresponding to a CORESET of current RMSI.

The UE may receive second configuration information sent by the base station through radio resource control (RRC) signaling, wherein the second configuration information is used to configure the bandwidth part corresponding to the CORESET of the current RMSI as an active bandwidth part, and obtain an IE by parsing the second configuration information, and obtain the first configuration information by parsing the IE.

At step S302, the time-frequency position of the SSB corresponding to the CORESET of the current RMSI is determined based on a position of the CORESET of the current RMSI and the first configuration information.

In this embodiment, in response to receiving the first configuration information, the UE may determine the time-frequency position of the SSB corresponding to the CORESET of the current RMSI based on the position of the CORESET of the current RMSI and the first configuration information.

In the above embodiment, by receiving the first configuration information and determining the time-frequency position of the SSB corresponding to the CORESET of the current RMSI based on the position of the CORESET of the current RMSI and the first configuration information, errors during performing subsequent rate matching can be avoided.

Figure 4:
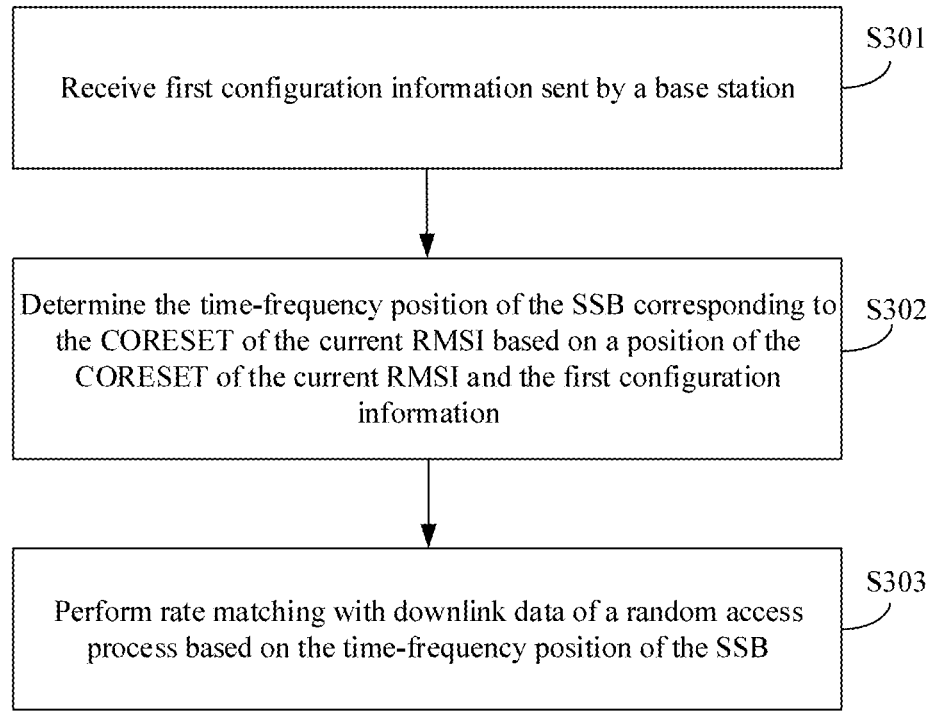
FIG. 4 is a flowchart of another method of determining a time-frequency position according to an exemplary embodiment of the present application.

FIG. 4 is a flowchart of another method of determining a time-frequency position according to an exemplary embodiment of the present application. As shown in FIG. 4, following step S302 the method may further include step S303.

At step S303, the rate matching is performed with downlink data of a random access process based on the time-frequency position of the SSB.

In this embodiment, in response to that the time-frequency position of the SSB has been determined, the rate matching may be performed with the downlink data in the random access process, and errors caused by obtaining an incorrect time-frequency position of the SSB may be avoided.

In the above embodiment, by performing the rate matching with the downlink data in the random access process based on the time-frequency position of the SSB, errors during performing the rate matching can be avoided.

Figure 5:
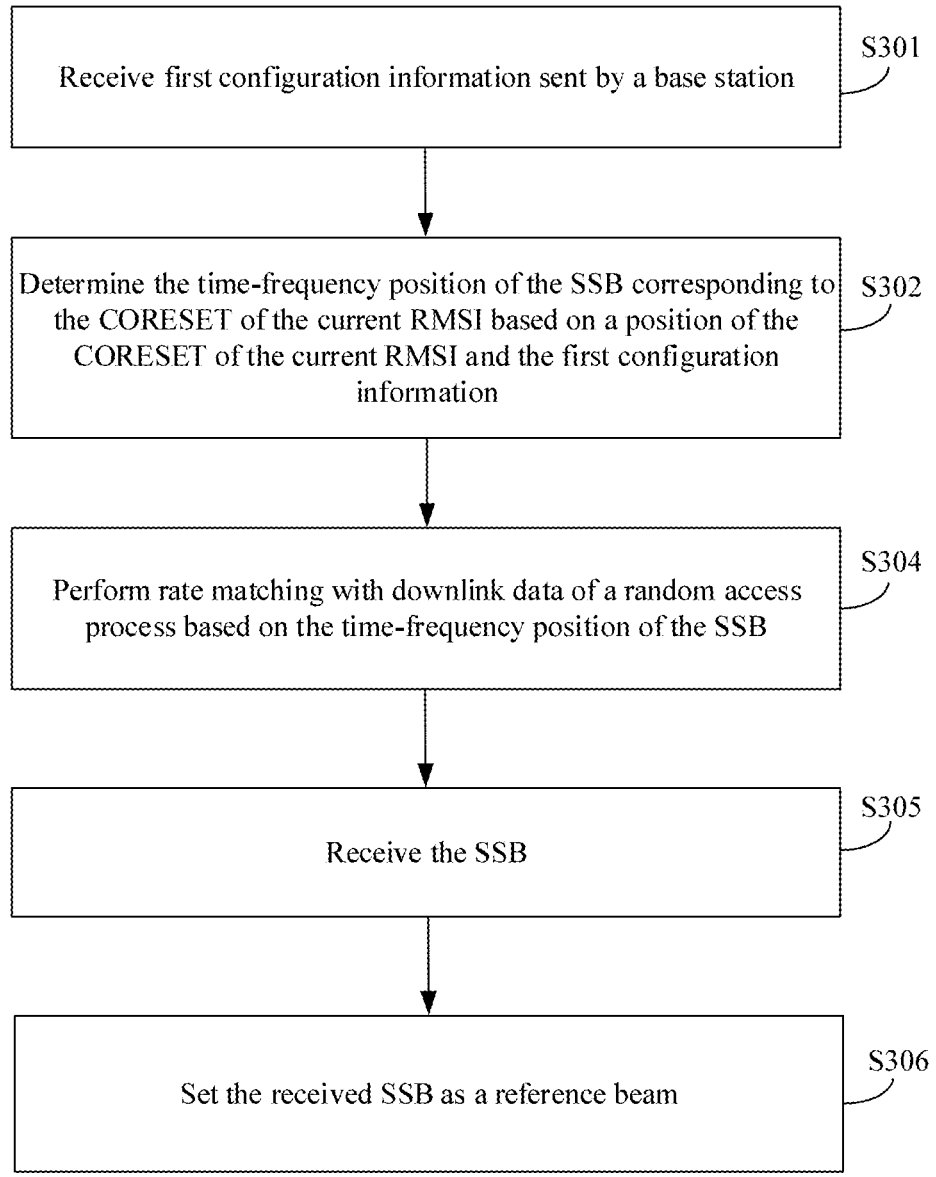
FIG. 5 is a flowchart of another method of determining a time-frequency position according to an exemplary embodiment of the present application.

FIG. 5 is a flowchart of another method of determining a time-frequency position according to an exemplary embodiment of the present application. As shown in FIG. 5, following step S302 the method may further include steps S304 to S306.

At step S304, the rate matching is performed with downlink data of a random access process based on the time-frequency position of the SSB.

At step S305, the SSB is received.

At step S306, the received SSB is set as a reference beam.

In this embodiment, in response to that the time-frequency position of the SSB has been determined, the rate matching may be performed with the downlink data in the random access process, and at the same time, the SSB may be received and set as the reference beam.

In the above embodiment, by performing the rate matching with the downlink data in the random access process based on the time-frequency position of the SSB, and receiving the SSB to make the UE being capable of setting the received SSB as the reference beam, a condition for correct data transmission is provided.

Figure 6:
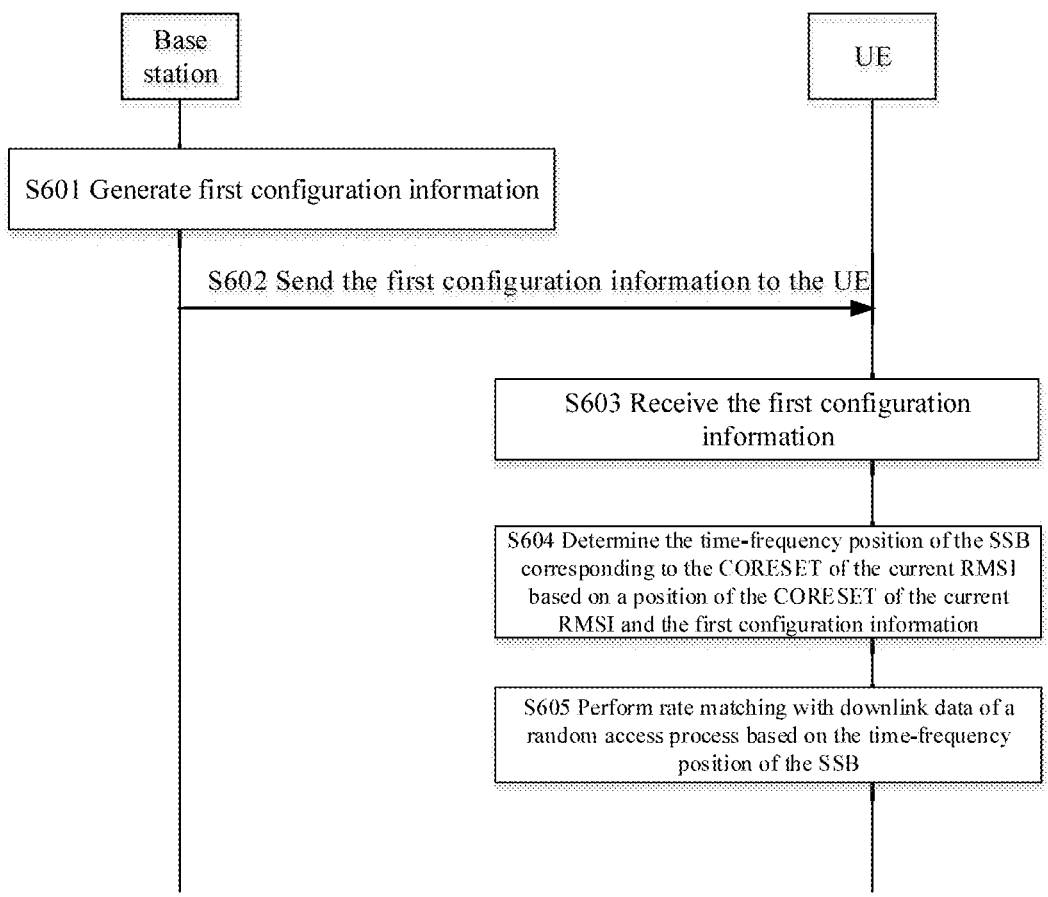
FIG. 6 is a signaling flowchart of a method of determining a time-frequency position according to an exemplary embodiment of the present application.

FIG. 6 is a signaling flowchart of a method of determining a time-frequency position according to an exemplary embodiment of the present application. This embodiment is described from the perspective of the interaction between a UE and a base station. As shown in FIG. 6, the method includes steps S601 to S605.

At step S601, the base station generates first configuration information, wherein the first configuration information indicates a time-frequency position of a synchronization signal block (SSB) corresponding to a common control resource set (CORESET) of current remaining minimum system information (RMSI).

The SSB refers to a synchronization signal block or a physical broadcast channel block.

At step S602, the base station sends the first configuration information to the UE.

At step S603, the UE receives the first configuration information sent by the base station.

At step S604, the UE determines the time-frequency position of the SSB corresponding to the CORESET of the current RMSI based on a position of the CORESET of the current RMSI and the first configuration information.

At step S605, the UE performs rate matching with downlink data of a random access process based on the time-frequency position of the SSB.

In the above embodiment, with the interaction between the base station and the UE, the UE is caused to receive the first configuration information and determine the time-frequency position of the SSB corresponding to the CORESET of the current RMSI based on the position of the CORESET of the current RMSI and the first configuration information, so that errors during performing subsequent rate matching can be avoided.

Figure 7:
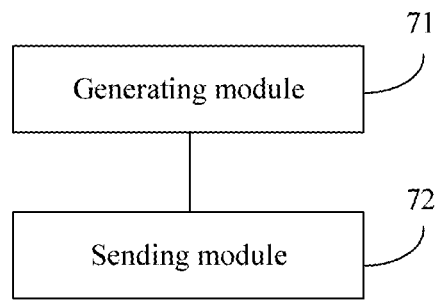
FIG. 7 is a block diagram of an apparatus for configuring information according to an exemplary embodiment of the present application.

FIG. 7 is a block diagram of an apparatus for configuring information according to an exemplary embodiment. The apparatus may be located in a base station. As shown in FIG. 7, the apparatus includes a generating module 71 and a sending module 72.

The generating module 71 is configured to generate first configuration information, wherein the first configuration information indicates a time-frequency position of a synchronization signal block (SSB) corresponding to a common control resource set (CORESET) of current remaining minimum system information (RMSI).

The SSB refers to a synchronization signal block or a physical broadcast channel block.

In this embodiment, the time-frequency position relationship between the CORESET of the current RMSI and the SSB may be shown in FIG. 1B, FIG. 1C and FIG. 1D. In FIG. 1B, CORESET 11 of the current RMSI and SSB 12 are locate in the same BWP in frequency domain but differ in time domain. In FIG. 1C, CORESET 11 of the current RMSI and SSB 12 form a frequency-division multiplexing but differ in time domain. In FIG. 1D, CORESET 11 of the current RMSI and SSB 12 form a frequency-division multiplexing and are the same in time domain.

In this embodiment, the first configuration information may be used to indicate the time-frequency position of the SSB corresponding to the CORESET of the current RMSI. Since FIGS. 1B-1D show three time-frequency position relationships, the first configuration information is to occupy 2 bits. For example, three code points, (00, 01, 10), may be used to represent the three time-frequency position relationships shown in FIGS. 1B-1D, and the remaining code point, (11), may be used as a reserved bit or an extended bit.

The sending module 72 is configured to send the first configuration information generated by the generating module 71 to a UE.

In the above embodiment, by generating and sending to the UE the first configuration information indicating the time-frequency position of the SSB corresponding to the CORESET of the current RMSI, a flexible configuration for time-frequency position of SSB can be realized, and the UE can easily get the time-frequency position of the SSB corresponding to the CORESET of the current RMSI based on the position of the CORESET of the current RMSI and the received first configuration information.

Figure 8:
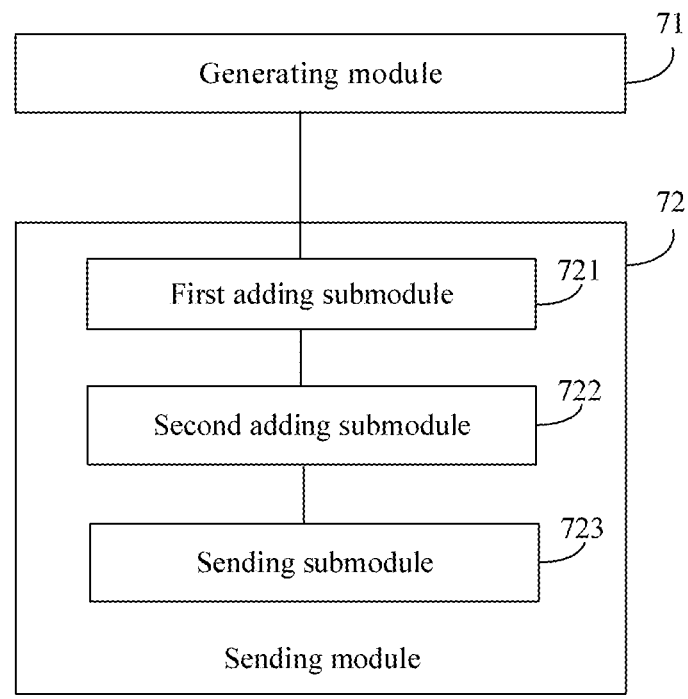
FIG. 8 is a block diagram of another apparatus for configuring information according to an exemplary embodiment of the present application.

FIG. 8 is a block diagram of another apparatus for configuring information according to an exemplary embodiment. As shown in FIG. 8, on the basis of the embodiment shown in FIG. 7, the sending module 72 may include a first adding submodule 721, a second adding submodule 722 and a sending submodule 723.

The first adding submodule 721 is configured to add the first configuration information to an IE.

The base station may add the first configuration information to a certain IE.

The second adding submodule 722 is configured to add the IE to the second configuration information, wherein the first configuration information has been added to the IE by the first adding submodule 721, and the second configuration information is used to configure the bandwidth part corresponding to the CORESET of the current RMSI as an active bandwidth part.

The sending submodule 723 is configured to send the second configuration information to the UE through RRC signaling, wherein the IE has been added to the second configuration information by the second adding submodule 722.

In the above embodiment, since the first configuration information is included in the IE, and the IE is included in the second configuration information, by sending the second configuration information to the UE through RRC signaling, an objective of sending the first configuration information to the UE is achieved with the simple implementation.

Figure 9:
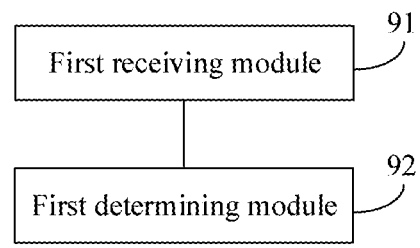
FIG. 9 is a block diagram of an apparatus for determining a time-frequency position according to an exemplary embodiment of the present application.

FIG. 9 is a block diagram of an apparatus for determining a time-frequency position according to an exemplary embodiment. The apparatus may be located in a UE. As shown in FIG. 9, the apparatus includes a first receiving module 91 and a first determining module 92.

The first receiving module 91 is configured to receive first configuration information sent by a base station, wherein the first configuration information indicates a time-frequency position of a synchronization signal block (SSB) corresponding to a common control resource set (CORESET) of current remaining minimum system information (RMSI).

The UE may receive second configuration information sent by the base station through RRC signaling, wherein the second configuration information is used to configure the bandwidth part corresponding to the CORESET of the current RMSI as an active bandwidth part, and obtain an IE by parsing the second configuration information, and obtain the first configuration information by parsing the IE.

The first determining module 92 is configured to determine the time-frequency position of the SSB corresponding to the CORESET of the current RMSI based on the position of the CORESET of the current RMSI and the first configuration information received by the first receiving module 91.

In this embodiment, in response to receiving the first configuration information, the UE may determine the time-frequency position of the SSB corresponding to the CORESET of the current RMSI based on the position of the CORESET of the current RMSI and the first configuration information.

In the above embodiment, by receiving the first configuration information and determining the time-frequency position of the SSB corresponding to the CORESET of the current RMSI based on the position of the CORESET of the current RMSI and the first configuration information, errors during performing subsequent rate matching can be avoided.

Figure 10:
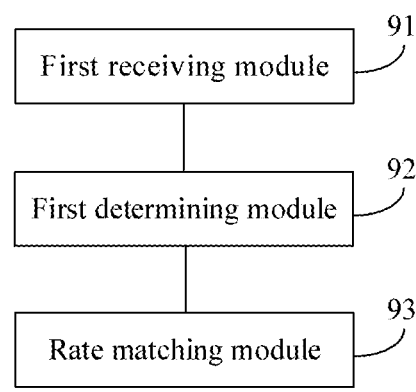
FIG. 10 is a block diagram of another apparatus for determining a time-frequency position according to an exemplary embodiment of the present application.

FIG. 10 is a block diagram of another apparatus for determining a time-frequency position according to an exemplary embodiment. As shown in FIG. 10, on the basis of the embodiment shown in FIG. 9, the apparatus may include a rate matching module 93.

The rate matching module 93 is configured to, in response to the first determining module 92 determining the time-frequency position of the SSB corresponding to the CORESET of the current RMSI, perform the rate matching with downlink data of a random access process based on the time-frequency position of the SSB.

In this embodiment, in response to that the time-frequency position of the SSB has been determined, the rate matching may be performed with the downlink data in the random access process, and errors caused by obtaining an incorrect time-frequency position of the SSB may be avoided.

In the above embodiment, by performing the rate matching with the downlink data in the random access process based on the time-frequency position of the SSB, errors during performing the rate matching can be avoided.

Figure 11:
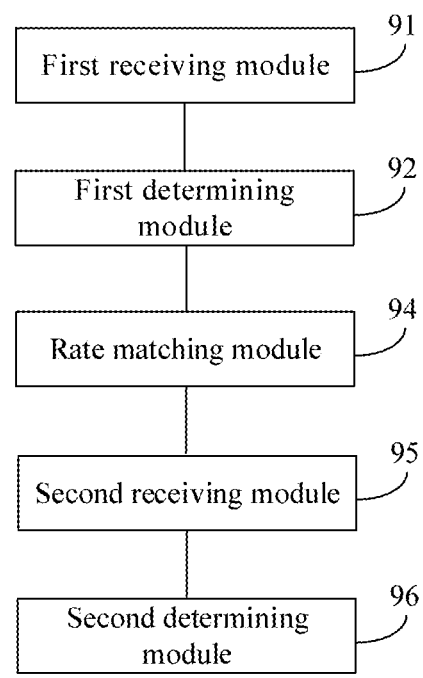
FIG. 11 is a block diagram of another apparatus for determining a time-frequency position according to an exemplary embodiment of the present application.

FIG. 11 is a block diagram of another apparatus for determining a time-frequency position according to an exemplary embodiment. As shown in FIG. 11, on the basis of the embodiment shown in FIG. 9, the apparatus may include a rate matching module 94, a second receiving module 95 and a second determining module 96.

The rate matching module 94 is configured to, in response to the first determining module determining the time-frequency position of the SSB corresponding to the CORESET of the current RMSI, perform rate matching with downlink data of a random access process based on the time-frequency position of the SSB.

The second receiving module 95 is configured to receive the SSB in response to the rate matching module 94 performing the rate matching.

The second determining module 96 is configured to set the SSB received by the second receiving module 95 as a reference beam.

In this embodiment, in response to that the time-frequency position of the SSB has been determined, the rate matching may be performed with the downlink data in the random access process, and at the same time, the SSB may be received and set as the reference beam.

In the above embodiment, by performing the rate matching with the downlink data in the random access process based on the time-frequency position of the SSB, and receiving the SSB to make the UE be capable of setting the received SSB as the reference beam, a condition for correct data transmission is provided.

Figure 12:
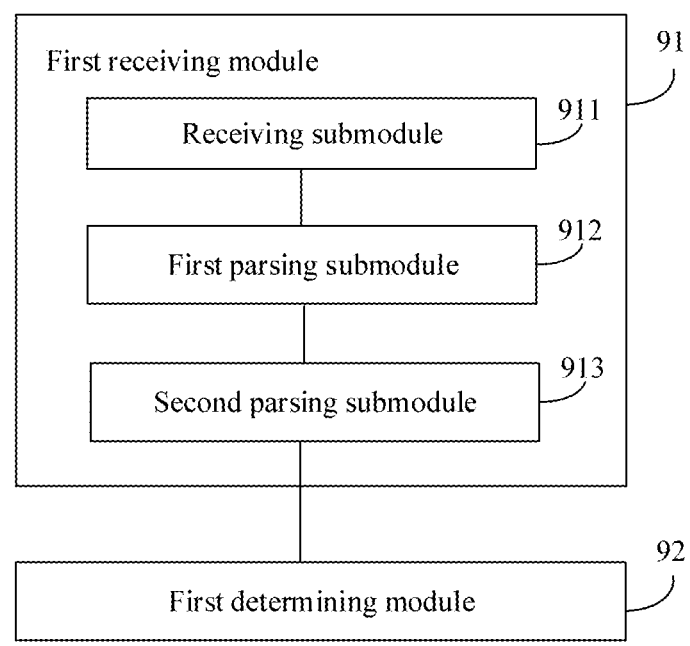
FIG. 12 is a block diagram of another apparatus for determining a time-frequency position according to an exemplary embodiment of the present application.

FIG. 12 is a block diagram of another apparatus for determining a time-frequency position according to an exemplary embodiment. As shown in FIG. 12, on the basis of the embodiment shown in FIG. 9, the first receiving module 91 may include a receiving submodule 911, a first parsing submodule 912 and a second parsing submodule 913.

The receiving submodule 911 is configured to receive the second configuration information sent by the base station through RRC signaling, wherein the second configuration information is used to configure the bandwidth part corresponding to the CORESET of the current RMSI as the active bandwidth part.

The first parsing submodule 912 is configured to obtain the IE by parsing the second configuration information received by the receiving submodule 911.

The second parsing submodule 913 is configured to obtain the first configuration information by parsing the IE which has been obtained by parsing by the first parsing submodule 912.

In the above embodiment, by receiving the second configuration information, obtaining the IE by parsing the second configuration information, and then obtaining the first configuration information by parsing the IE, it is simple to implement.

Figure 13:
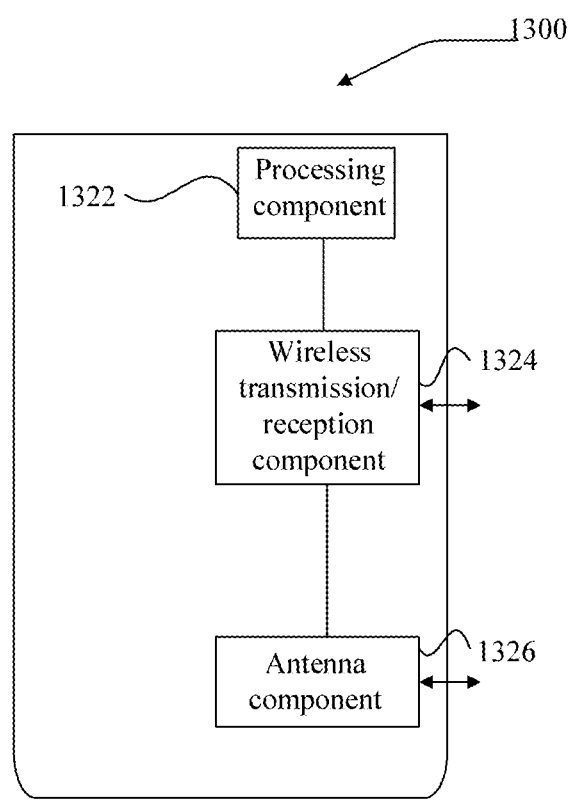
FIG. 13 is a block diagram applicable to an apparatus for configuring information according to an exemplary embodiment of the present application.

FIG. 13 is a block diagram applicable to an apparatus for configuring information according to an exemplary embodiment. A device 1300 may be provided as a base station. With reference to FIG. 13, the device 1300 includes a processing component 1322, a wireless transmission/reception component 1324, an antenna component 1326, and a signal processing part unique to a wireless interface. The processing component 1322 may further include one or more processors.

One of the processors in the processing component 1322 may be configured to:

generate first configuration information, wherein the first configuration information indicates a time-frequency position of a synchronization signal block (SSB) corresponding to a common control resource set (CORESET) of current remaining minimum system information (RMSI); and send the first configuration information to user equipment (UE).

In an exemplary embodiment, a non-transitory computer-readable storage medium including instructions is also provided, wherein the instructions can be executed by the processing component 1322 of the device 1300 to complete the above method of configuring information. For example, the non-transitory computer-readable storage medium may be a ROM, a random access memory (RAM), a CD-ROM, a magnetic tape, a floppy disk, an optical data storage device, and the like.

Figure 14:
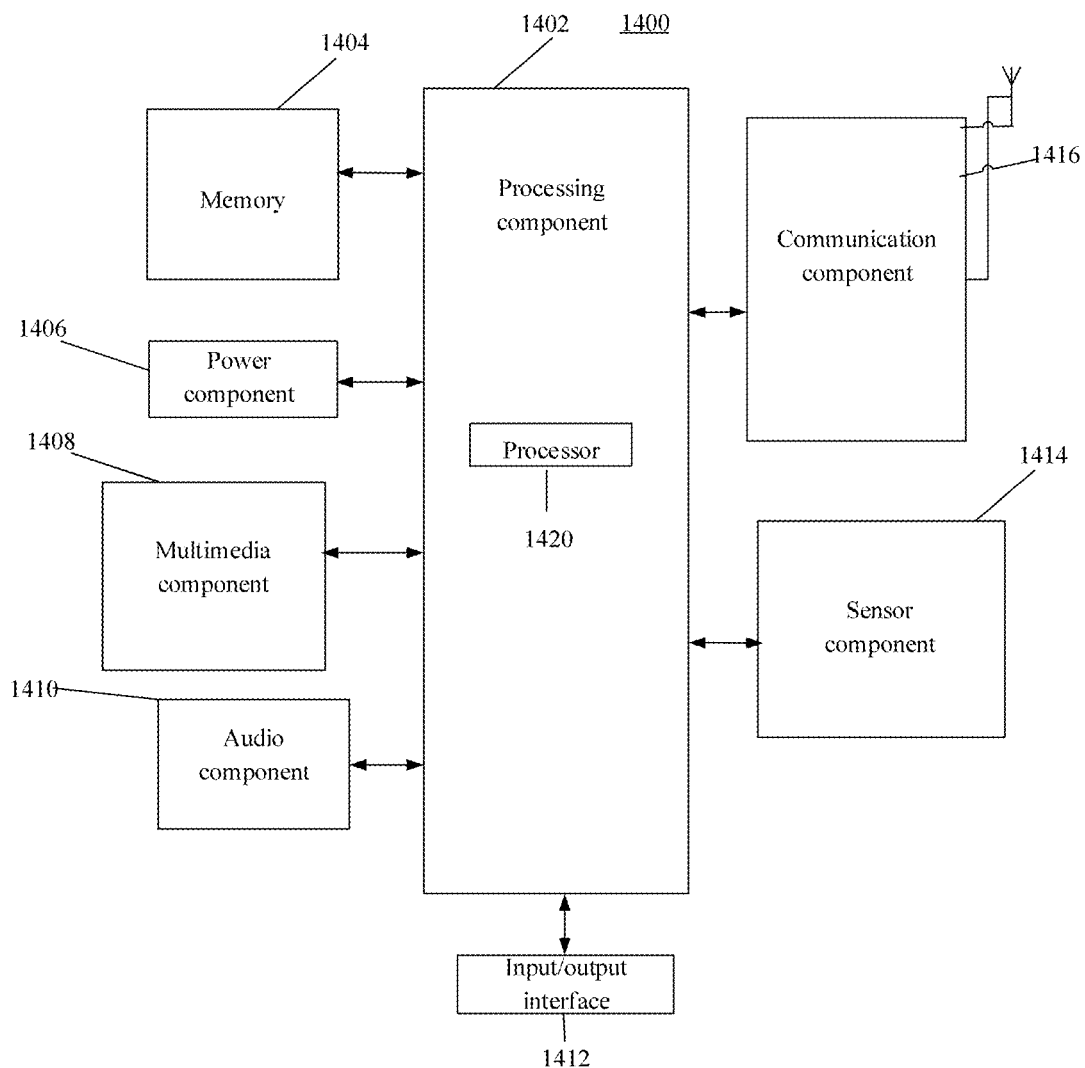
FIG. 14 is a block diagram applicable to an apparatus for determining a time-frequency position according to an exemplary embodiment of the present application.

FIG. 14 is a block diagram applicable to an apparatus for determining a time-frequency position according to an exemplary embodiment. For example, a device 1400 may be a mobile phone, a computer, a digital broadcasting terminal, a messaging device, a game console, a tablet device, a medical device, a fitness device, a personal digital assistant, or other user equipment.

With reference to FIG. 14, the device 1400 may include one or more of the following components: a processing component 1402, memory 1404, a power component 1406, a multimedia component 1408, an audio component 1410, an input/output (I/O) interface 1412, a sensor component 1414, and a communication component 1416.

The processing component 1402 generally controls the overall operations of the device 1400, such as operations associated with display, telephone calls, data communications, camera operations, and recording operations. The processing component 1402 may include one or more processors 1420 to execute instructions to complete all or part of the steps of the above method. In addition, the processing component 1402 may include one or more modules to facilitate interaction between the processing component 1402 and other components. For example, the processing component 1402 may include a multimedia module to facilitate interaction between the multimedia component 1408 and the processing component 1402.

One of the processors 1420 in the processing component 1402 may be configured to:

receive first configuration information sent by a base station, wherein the first configuration information indicates a time-frequency position of a synchronization signal block (SSB) corresponding to a common control resource set (CORESET) of current remaining minimum system information (RMSI); and determine the time-frequency position of the SSB corresponding to the CORESET of the current RMSI based on the position of the CORESET of the current RMSI and the first configuration information.

The memory 1404 is configured to store various types of data to support operation at the device 1400. Examples of such data include instructions for any application or method operating on the device 1400, contact data, phone book data, messages, pictures, videos, and so on. The memory 1404 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The power component 1406 provides power to various components of the device 1400. The power component 1406 may include a power management system, one or more power sources, and other components associated with generating, managing, and distributing power for the device 1400.

The multimedia component 1408 includes a screen between the device 1400 and the user that provides an output interface. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure related to the touch or sliding operation. In some embodiments, the multimedia component 1408 includes a front camera and/or a rear camera. When the device 1400 is in an operation mode, such as a shooting mode or a video mode, the front camera and/or the rear camera may receive external multimedia data. Each front and rear camera can be a fixed optical lens system or have focal length and optical zooming capabilities.

The audio component 1410 is configured to output and/or input audio signals. For example, the audio component 1410 includes a microphone (MIC) that is configured to receive an external audio signal when the device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker for outputting audio signals.

The I/O interface 1412 provides an interface between the processing component 1402 and a peripheral interface module. The peripheral interface module may be a keyboard, a click wheel, a button, or the like. These buttons may include, but are not limited to, a home button, a volume button, a start button, and a lock button.

The sensor component 1414 includes one or more sensors for providing the device 1400 with status assessment in various aspects. For example, the sensor component 1414 can detect an open/closed state of the device 1400, a relative positioning of components, such as the display and keypad of the device 1400 and the sensor component 1414 can also detect a change in position of the device 1400 or a component of the device 1400, the presence or absence of user contact with the device 1400, orientation or acceleration/deceleration of the device 1400, and temperature change of the device 1400. The sensor component 1414 may include a proximity sensor configured to detect the presence of nearby objects without any physical contact. The sensor component 1414 may also include a light sensor, such as a Complementary Metal-Oxide-Semiconductor (CMOS) or Charged Coupled Device (CCD) image sensor, for use in imaging applications. In some embodiments, the sensor component 1414 may further include an acceleration sensor, a gyro sensor, a magnetic sensor, a pressure sensor, or a temperature sensor.

The communication component 1416 is configured to facilitate wired or wireless communication between the device 1400 and other devices. The device 1400 may access a wireless network based on a communication standard, such as Wi-Fi, 2G, 3G, or a combination thereof. In an exemplary embodiment, the communication component 1416 receives broadcast signals or broadcast related information from an external broadcast management system via a broadcast channel. In one exemplary embodiment, the communication component 1416 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 1400 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or other electronic components for performing the above methods.

In an exemplary embodiment, there is also provided a non-transitory computer-readable storage medium including instructions, such as the memory 1404 including instructions executable by the processor 1420 of the device 1400 to implement the above method. For example, the non-transitory computer-readable storage medium may be a ROM, a random access memory (RAM), a CD-ROM, a magnetic tape, a floppy disk, and an optical data storage device.

Since the apparatus embodiments essentially correspond to the method embodiments, reference may be made to the description of related parts of the method embodiments. The apparatus embodiments described above are merely illustrative, wherein the units described as separate components may or may not be physically separated, and the components displayed as units may or may not be physical units, that is, may be located in one place or distributed to multiple units in a network. Some or all of the modules may be selected according to actual needs to achieve the objectives of the present disclosure. It can be understood and implemented by those of ordinary skill in the art without any creative effort.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in the process, method, article or device including the elements.

Other implementations of the present disclosure will be readily apparent to those skilled in the art after implementing the disclosure by referring to the specification. The present application is intended to cover any variations, uses, or adaptations of the present disclosure which are in accordance with the general principles of the present disclosure and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described structures shown in the drawings, and various modifications and changes can be made to the present disclosure without departing from the scope thereof. The scope of the present disclosure is to be limited only by the appended claims.

The invention claimed is:

1. A method of configuring information of indicating time-frequency position of synchronization signal block (SSB), applicable to a base station, comprising:
generating first configuration information, wherein the first configuration information indicates a time-frequency position of a SSB corresponding to a common control resource set (CORESET) of current remaining minimum system information (RMSI); and
sending the first configuration information to user equipment (UE), which comprises:
adding the first configuration information to an information element (IE);
adding the IE to second configuration information, wherein the second configuration information is used to configure a bandwidth part corresponding to the CORESET of the current RMSI as an active bandwidth part; and
sending the second configuration information to the UE through radio resource control (RRC) signaling.

2. A method of determining a time-frequency position of synchronization signal block (SSB), applicable to user equipment (UE), comprising:
receiving first configuration information included in an information element (IE) which is included in second configuration information sent by a base station through radio resource control (RRC) signaling, wherein the first configuration information indicates a time-frequency position of a SSB corresponding to a common control resource set (CORESET) of current remaining minimum system information (RMSI); and
determining the time-frequency position of the SSB corresponding to the CORESET of the current RMSI based on a position of the CORESET of the current RMSI and the first configuration information;
wherein the second configuration information is used to configure a bandwidth part corresponding to the CORESET of the current RMSI as an active bandwidth part.

3. The method according to claim 2, further comprising:
in response to that the time-frequency position of the SSB corresponding to the CORESET of the current RMSI has been determined based on the position of the CORESET of the current RMSI and the first configuration information, performing rate matching with downlink data of a random access process based on the time-frequency position of the SSB.

4. The method according to claim 2, further comprising:
in response to that the time-frequency position of the SSB corresponding to the CORESET of the current RMSI has been determined based on the position of the CORESET of the current RMSI and the first configuration information, performing rate matching with downlink data of a random access process based on the time-frequency position of the SSB;
receiving the SSB; and
setting the received SSB as a reference beam.

5. The method according to claim 2, wherein the receiving the first configuration information included in the IE which is included in the second configuration information sent by the base station through the RRC signaling comprises:
receiving the second configuration information sent by the base station through the RRC signaling;
obtaining the IE by parsing the second configuration information; and
obtaining the first configuration information by parsing the IE.

6. User equipment, comprising:
a processor;
memory for storing executable instructions by the processor;
wherein the processor is configured to:
receive first configuration information included in an information element (IE) which is included in second configuration information sent by a base station through radio resource control (RRC) signaling, wherein the first configuration information indicates a time-frequency position of a synchronization signal block (SSB) corresponding to a common control resource set (CORESET) of current remaining minimum system information (RMSI); and
determine the time-frequency position of the SSB corresponding to the CORESET of the current RMSI based on a position of the CORESET of the current RMSI and the first configuration information;
wherein the second configuration information is used to configure a bandwidth part corresponding to the CORESET of the current RMSI as an active bandwidth part.

7. A communication system implementing the method of claim 1, comprising the base station and the UE, wherein the UE is configured to:
receive the first configuration information included in an information element (IE) which is included in second configuration information sent by the base station through radio resource control (RRC) signaling; and
determine the time-frequency position of the SSB corresponding to the CORESET of the current RMSI based on a position of the CORESET of the current RMSI and the first configuration information;
wherein the second configuration information is used to configure a bandwidth part corresponding to the CORESET of the current RMSI as an active bandwidth part.

8. The system of claim 7, wherein the UE is further configured to:
in response to that the time-frequency position of the SSB corresponding to the CORESET of the current RMSI has been determined based on the position of the CORESET of the current RMSI and the first configuration information, perform rate matching with downlink data of a random access process based on the time-frequency position of the SSB.

9. The system of claim 7, wherein the UE is further configured to:
in response to that the time-frequency position of the SSB corresponding to the CORESET of the current RMSI has been determined based on the position of the CORESET of the current RMSI and the first configuration information, perform rate matching with downlink data of a random access process based on the time-frequency position of the SSB;
receive the SSB; and
set the received SSB as a reference beam.

10. The system of claim 7, wherein the UE is configured to receive the first configuration information included in the IE which is included in the second configuration information sent by the base station through the RRC signaling by:
receiving the second configuration information sent by the base station through the RRC signaling;
obtaining the IE by parsing the second configuration information; and
obtaining the first configuration information by parsing the IE.

11. The system of claim 7, wherein the base station is configured to realize a flexible configuration for time-frequency position of SSB, to thereby facilitate the UE getting the time-frequency position of the SSB corresponding to the CORESET of the current RMSI based on the position of the CORESET of the current RMSI and the received first configuration information.

12. The system of claim 11, wherein the UE is configured to avoid errors in performing subsequent rate matching by receiving the first configuration information and determining the time-frequency position of the SSB corresponding to the CORESET of the current RMSI according to the position of the CORESET of the current RMSI and the first configuration information.

* * * * *